United States Patent
Minshull (10) Patent No.: US 8,752,294 B2
(45) Date of Patent: Jun. 17, 2014

(54) METHOD OF MANUFACTURING A STIFFENED PANEL

(75) Inventor: Alan Minshull, Bristol (GB)

(73) Assignee: Airbus Operations Limited, Bristol (GB)

( * ) Notice: Subject to any disclaimer, the term of this patent is extended or adjusted under 35 U.S.C. 154(b) by 1003 days.

(21) Appl. No.: 12/451,227

(22) PCT Filed: May 23, 2008

(86) PCT No.: PCT/GB2008/050371
§ 371 (c)(1),
(2), (4) Date: Mar. 2, 2010

(87) PCT Pub. No.: WO2008/146034
PCT Pub. Date: Dec. 4, 2008

(65) Prior Publication Data
US 2010/0170165 A1 Jul. 8, 2010

(30) Foreign Application Priority Data
May 31, 2007 (GB) .................................. 0710349.2

(51) Int. Cl.
*B21D 53/88* (2006.01)
(52) U.S. Cl.
USPC .............................. 29/897.2; 29/464; 29/466
(58) Field of Classification Search
USPC ........... 29/897.3, 897.32, 464, 466, 467, 468, 29/281.1, 281.5, 897, 897.2
See application file for complete search history.

(56) References Cited

U.S. PATENT DOCUMENTS

| 4,894,903 | A | 1/1990 | Woods |
|---|---|---|---|
| 5,033,178 | A | 7/1991 | Woods |
| 5,341,556 | A | 8/1994 | Shubin et al. |
| 5,367,595 | A | 11/1994 | Jennings et al. |
| 5,906,863 | A | 5/1999 | Lombardi et al. |
| 6,143,378 | A | 11/2000 | Harwell et al. |
| 2004/0093731 | A1 | 5/2004 | Sarh |
| 2007/0023977 | A1 | 2/2007 | Braun et al. |

FOREIGN PATENT DOCUMENTS

| DE | 32 19 151 | 11/1983 |
|---|---|---|
| DE | 197 39 975 | 3/1998 |
| GB | 2 348 393 | 10/2000 |
| GB | 2 399 049 | 9/2004 |
| GB | 2 405 119 | 2/2005 |
| JP | 59-109587 | 7/1984 |
| WO | WO 92/16343 | 10/1992 |
| WO | WO 2007/034197 | 3/2007 |

OTHER PUBLICATIONS

Search Report for GB 0710349.2 dated Sep. 18, 2007.
Search Report for GB 0710349.2 dated Apr. 22, 2008.
Search Report for GB 0710349.2 dated Apr. 23, 2008.

(Continued)

*Primary Examiner* — David Bryant
*Assistant Examiner* — Ryan J Walters
(74) *Attorney, Agent, or Firm* — Nixon & Vanderhye P.C.

(57) ABSTRACT

A method of manufacturing a stiffened panel, and a datum part for use in such a method. The method comprises: holding the panel with a jig; holding a datum part with the jig; engaging the panel and the datum part with a stringer; and joining the stringer to the panel. Preferably an additive process is used to form the datum part. By growing the datum part in a series of layers, the shape of each layer can be selected to enable the shape or size of the datum part to be optimised.

12 Claims, 14 Drawing Sheets

(56) References Cited

OTHER PUBLICATIONS

International Search Report for PCT/GB2008/050371 mailed Mar. 26, 2009.
Written Opinion for PCT/GB2008/050371 mailed Mar. 26, 2009.
English translation of JP Office Action mailed Jan. 8, 2013 in JP 2010-509900.
EP Search Report and Search Opinion dated Jan. 7, 2013 in EP 12 15 0821.

METHOD OF MANUFACTURING A STIFFENED PANEL

This application is the U.S. national phase of International Application No. PCT/GB2008/050371 filed 23 May 2008 which designated the U.S. and claims priority to British Patent Application No. 0710349.2 filed 31 May 2007, the entire contents of each of which are hereby incorporated by reference.

FIELD OF THE INVENTION

The present invention relates to a method and apparatus for manufacturing a stiffened panel, and a datum part for use in such a method.

BACKGROUND OF THE INVENTION

A stringer tang is a tab of metal that extends longitudinally from the end of a stringer. This tab is used as a reference datum and has a bolt-hole therein. The tang is secured to a reference point on a jig (which is a known datum with respect to a panel) and hence locates the stringer spatially in relation to the panel. The stringer tang itself allows the stringer to be bolted to and structurally supported by the jig. Thus, the stringer is located in the correct position in relation to the panel.

The stringers are then riveted or fastened to the panel whereupon the entire assembly is released from the jig by removing the panel plus the stringers from the jig. The tangs are then cut off and the areas around them are treated to remove any protuberances or rough edges. This is a time consuming and laborious process.

SUMMARY OF THE INVENTION

A first aspect of the invention provides a method of manufacturing a stiffened panel, the method comprising:
  holding the panel with a jig;
  holding a datum part with the jig;
  engaging the panel and the datum part with a stringer; and
  joining the stringer to the panel,
wherein the datum part has been manufactured by an additive process.

The first aspect of the invention removes the requirement of stringer tangs. That is, the datum part enables the stringer to be located in the correct position in relation to the panel without requiring the stringer to be formed with a tang. Datum blocks with different shapes and sizes can be used in the manufacture of a single panel, each tailor-made to fit a respective stringer. In this case the method comprises: holding a plurality of datum parts with the jig, at least two of the datum parts having a different shape or size; engaging the panel with a plurality of stringers; engaging each datum part with a respective one of the stringers; and joining the stringers to the panel.

An additive process is used to form the datum part. By growing the datum part in a series of layers, the shape of each layer can be selected to enable the shape or size of the datum part to be optimised.

A second aspect of the invention provides a method of manufacturing a datum part for use in the method of the first aspect of the invention, the method comprising manufacturing the datum part with an additive process.

Typically each layer is grown by directing energy and/or material from a head to selected parts of a build region. The head and the build region may remain stationary during the growth process: for example the head may have a fixed array of lasers and/or nozzles which extend over the entire build region and are modulated as required to directing energy and/or material to selected parts of the build region. However more preferably the method further comprises causing relative movement between the head and the build region. Preferably this relative movement is caused by moving the head, but it will appreciated that the relative movement may be caused by moving the component or by a combined movement of both parts.

Various additive fabrication techniques may be used, including techniques in which the head directs material to selected parts of the build region, and techniques in which a series of beds of material are deposited on the build region and the head directs energy to selected parts of each bed.

Examples of the former include fused deposition modelling (in which the head extrudes hot plastic through a nozzle) and powder feed fabrication (in which a laser beam directs energy to fuse a powdered material as it is delivered to the build region). Advantages of these methods are that:
  the amount of wastage of material in the fabrication process is minimized;
  the datum part can be made from a different material to the component; and
  the datum part can be rotated relative to the head during the fabrication process in order to form a complex shape.

Examples of the latter include stereolithography (in which a laser is used to cure selected parts of a bed of liquid photopolymer) and powder bed fabrication (in which a series of beds of powder are deposited on the build region and selected parts of each bed are fused by a laser). Advantages of using the head to deliver energy to the selected parts of a previously deposited bed of material are that:
  unconsolidated parts of each bed can support successive beds, enabling relatively complex shapes to be formed.

Typically the datum part is formed by fusing a powder, for instance in a powder bed process or a powder feed process.

Typically the stringer extends lengthwise between a pair of end faces, and the datum part engages one of the end faces of the stringer.

Typically the datum block comprises one or more resilient members which engage the stringer. At least one of the resilient members may comprise a flexible cantilever arm and a projection which is configured to engage the stringer to form a snap-fit joint. Alternatively, or in addition, at least one of the resilient members may comprise a flexible spring which can flex to account for slight variations in width of the stringer.

Typically the datum part comprises a base; one or more height stops extending from the base by a first distance, and two or more side stops extending from the base by a second distance greater than the first distance.

The datum part may comprise a base; one or more side stop blocks extending from the base and positioned towards the periphery of the base; and one or more resilient members. In this case the method further comprises: engaging the stringer with the side stop block(s); and securing the stringer to the datum part with the resilient member(s).

A third aspect of the invention provides a datum part for use in the method of the first aspect of the invention, comprising a base; one or more side stop blocks extending from the base and positioned towards the periphery of the base; and one or more resilient members.

At least one of the resilient members may comprise a flexible cantilever arm and a projection which is configured to engage the stringer to form a snap-fit joint. Alternatively, or in addition, at least one of the resilient members may comprise a flexible spring which engages the stringer and can flex to account for slight variations in width of the stringer.

A fourth aspect of the invention provides apparatus for manufacturing a stiffened panel by the method of the first aspect of the invention, the apparatus comprising: a jig; and one or more datum parts which have been manufactured by an additive process.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
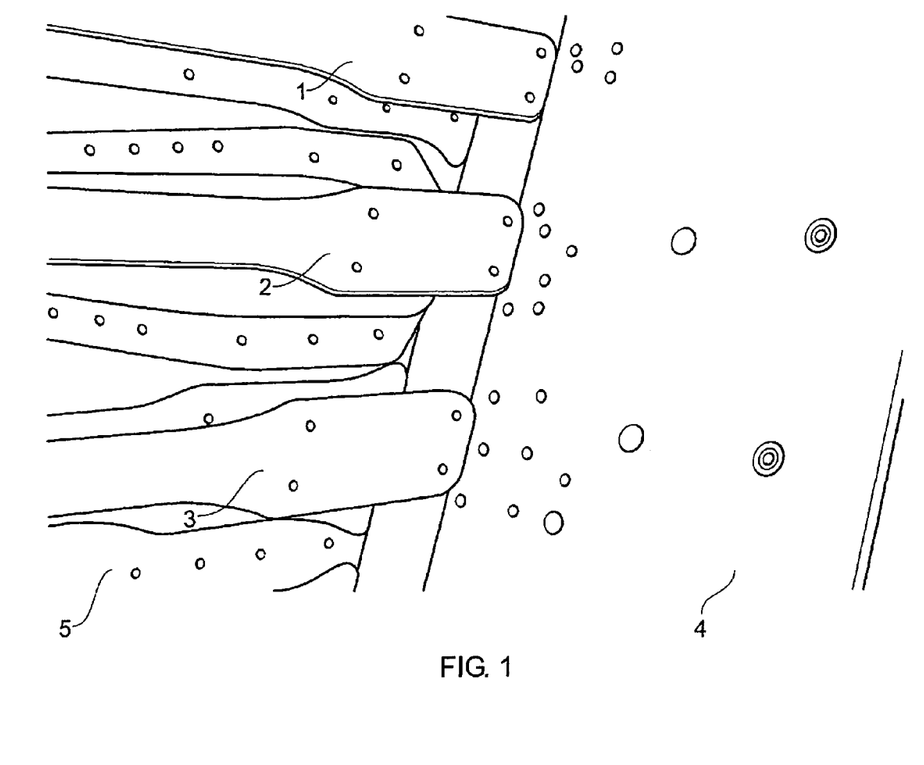
FIG. 1 shows a jig profile board, a skin and a set of stringers.

FIG. 1 shows a step in the assembly of a stiffened panel which forms the upper or lower skin of a wing box. The wing box comprises an upper and lower skin, each skin carrying a series of stringers on its inner surface which run in a spanwise direction along the wing box. A series of ribs run in a chord wise direction across the wing box and are joined to the upper and lower skins. Each stringer has an inboard end (conventionally known as a "stringer run-out") adjacent to the inboard rib (which is conventionally known as "rib 1") and an outboard end.

FIG. 1 shows the inboard run-outs of three stringers 1-3, a profile board 4 and a skin 5. The profile board 4 forms part of a jig, and has the same shape and size as "rib 1" of the wing box. The skin 5 is held by another part (not shown) of the jig.

Figure 2:
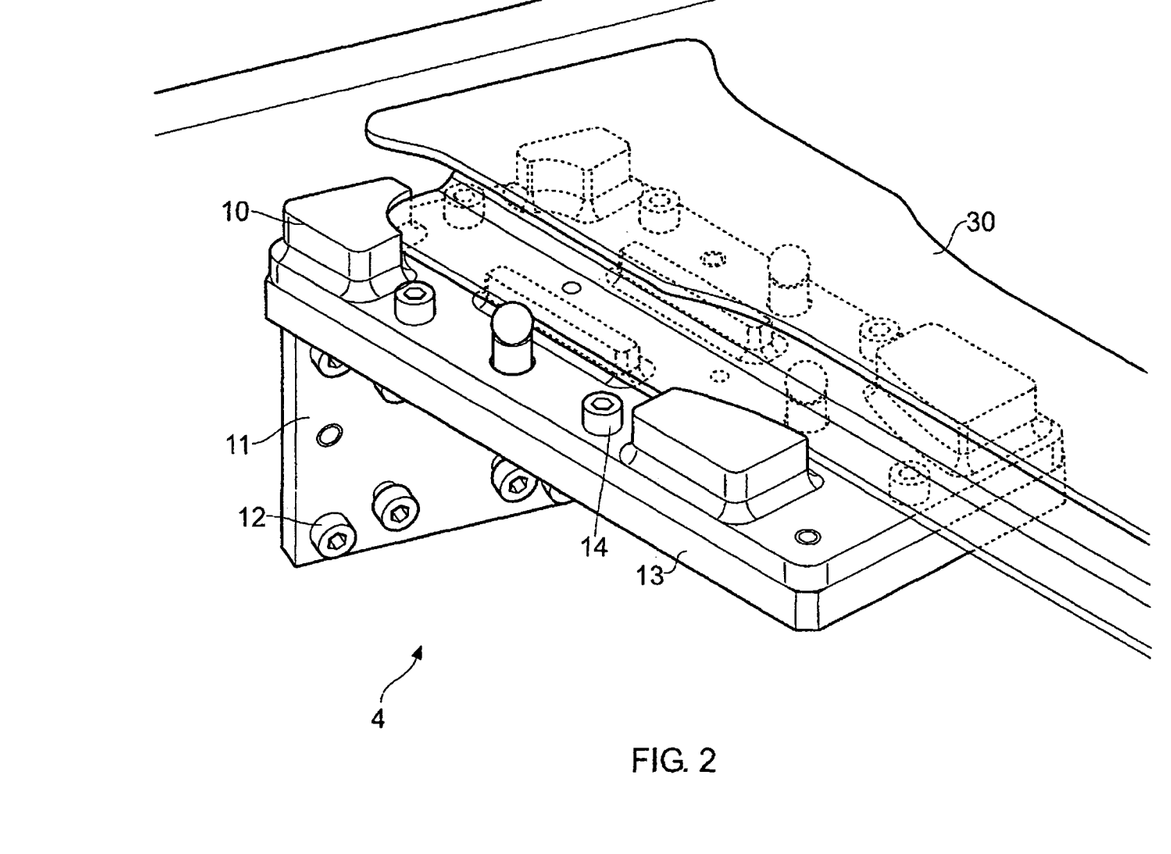
FIG. 2 shows a jig profile board, a datum part and a stringer run-out.

As shown in FIG. 2 a datum part 10 is held by the profile board 4. Note that the datum parts are not shown in FIG. 1. A vertical plate 11 of an L-shaped bracket is secured to the profile board 4 by fasteners 12, and the datum part 10 is secured to a horizontal plate 13 of the L-shaped bracket by fasteners 14.

Figure 3:
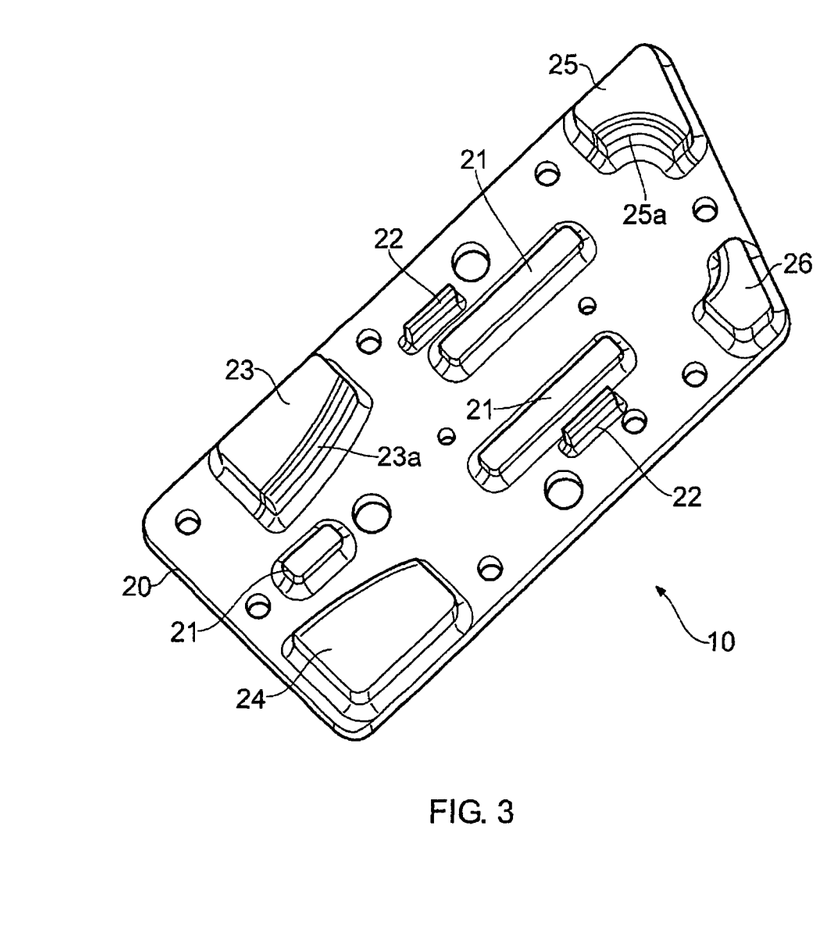
FIG. 3 is a perspective view of the datum part.

The upper face of the datum part 10 is shown in detail in FIG. 3. A plate 20 carries three stringer height stop blocks 21, a pair of resilient clips 22, and four stringer side stop blocks 23-26 at the periphery of the plate 20. The left-hand stop blocks 23 and 25 are formed with resilient springs 23a and 25a.

After the datum part 10 has been fixed in place on the profile board 4, the inboard end of a stringer 30 is clipped into place on the datum part as shown in FIG. 2. The structure of the stringer 30 is shown most clearly in FIGS. 4 and 6. The stringer 30 comprises a web 31, a pair of upper flanges 32,33 and a pair of lower flanges 34,35. As shown most clearly in FIG. 4, the upper flanges 32,33 are terminated short of the end of the stringer, and the web 31 has a tapered edge 36 extending beyond the end of the upper flanges 32,33.

When fixed to the datum part, the lower faces of the lower flanges 34,35 engage the stringer height stop blocks 21, and the sides and ends of the lower flanges 34,35 engage the nesting faces of the four stringer side stop blocks 23-26, as well as being secured against vertical movement by the clips 22.

Figure 6:
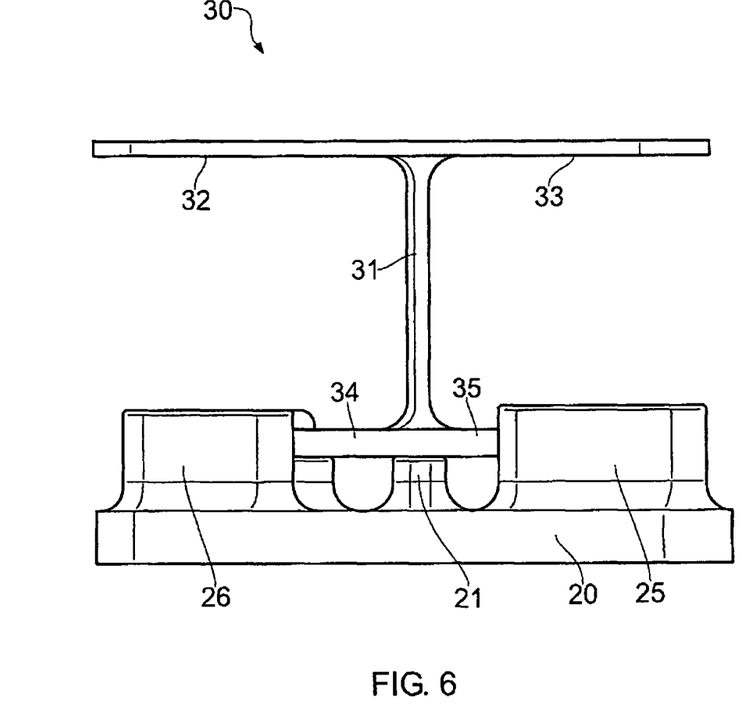
FIG. 6 is an end view of the stringer run-out and datum part.

As can be seen most clearly in FIG. 6, the height stop blocks 21 extend from the plate 20 by a first distance, and the side stop blocks 23-26 extending from the base by a second distance greater than the first distance.

Figure 4:
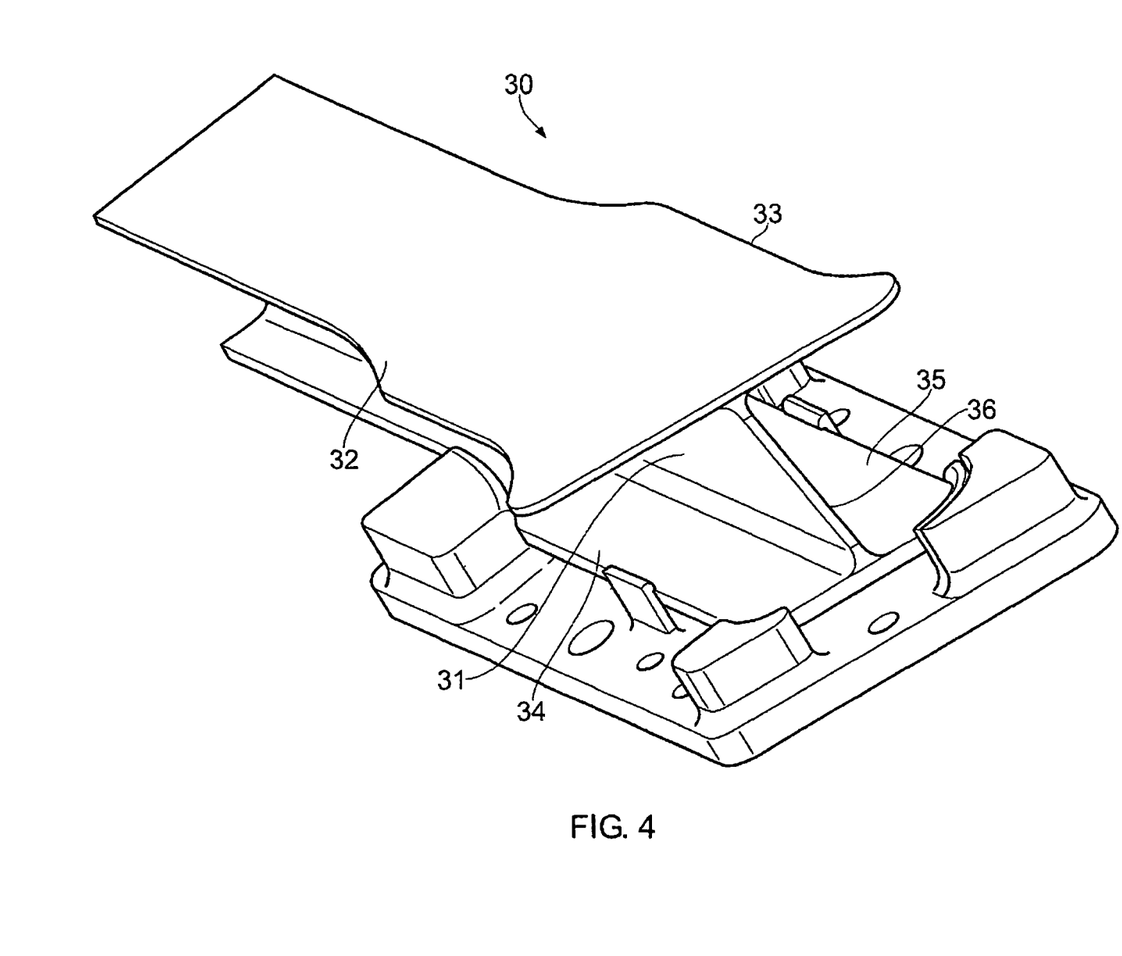
FIG. 4 is a perspective view of the stringer run-out and datum part.
Figure 5:
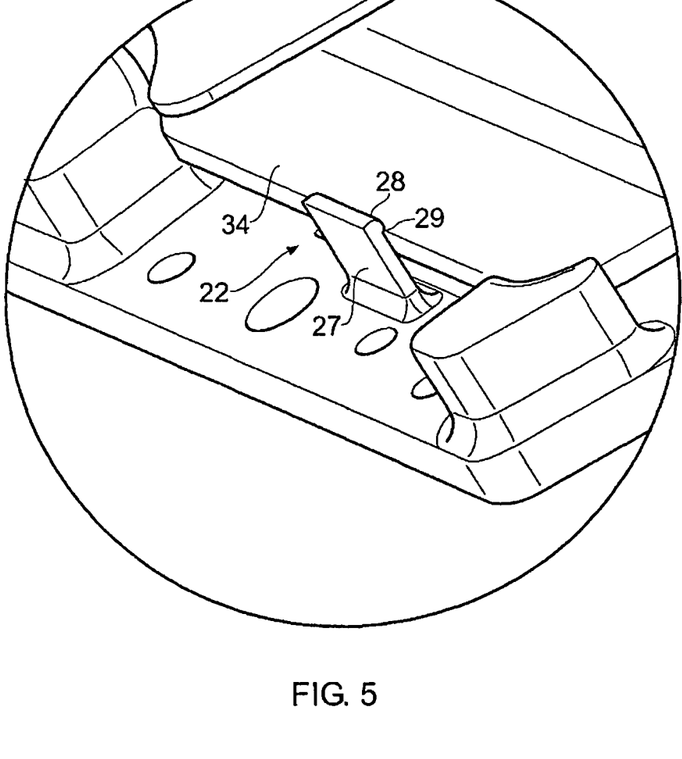
FIG. 5 is an enlarged perspective view of the stringer run-out and datum part.

FIG. 5 is an enlarged perspective view showing one of the clips 22 in detail. The other clip 22 has a similar form and works in a similar manner. The clip 22 has a cantilever arm 27, and a projecting nose configured with a curved upper edge 28 and sharp lower edge 29. As the stringer is pushed down, the edge of the flange 34 engages the curved upper edge 28 and the arm 27 bends back. As the edge of the stringer flange 34 clears the sharp edge 29, the clip snaps back resiliently into place to provide a cantilever snap-fit joint which locks the stringer securely against vertical movement as shown in FIG. 4.

The resilient springs 23a,25a can flex to account for slight variations in width of the stringer.

Figure 7:
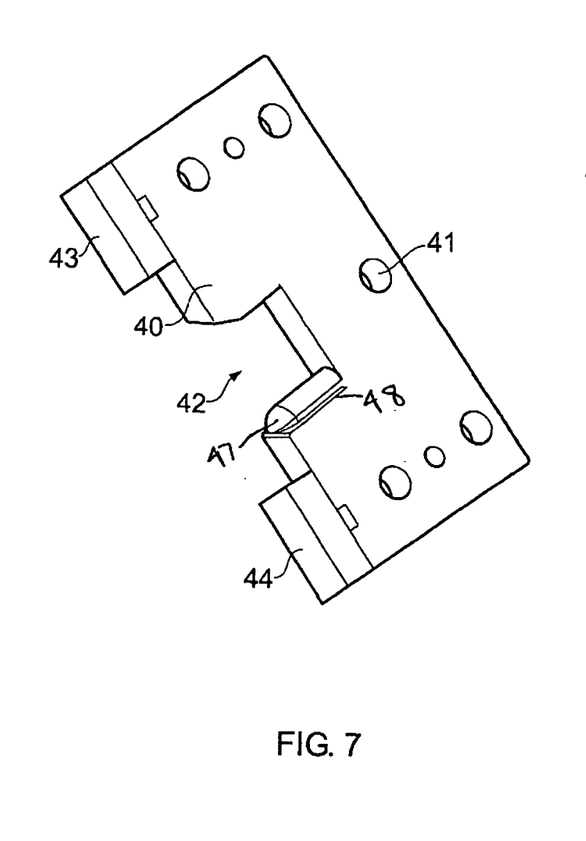
FIG. 7 is a perspective view of a nest plate.

FIG. 7 shows a nest plate 40. A series of such nest plates are held by the jig at spaced locations along the length of the stringer. The nest plate comprises a series of holes 41 which receive fasteners (not shown) for fixing the nest plate to the jig, and a slot 42 in an upper edge of the plate. The upper edge of the plate also carries a pair of renewable tips 43,44. After the inboard end of the stringer 30 has been fixed in place as shown in FIG. 2, the nest plates 40 are moved towards the stringer by the jig, until the upper flanges of the stringer are received in the slot 42, and each lower flange 34,35 is engaged by a respective one of the renewable tips 43,44 which press the lower flanges 34,35 against the skin. A resilient spring 47 is provided on one side of the slot 42. The spring 47 is separated from the body of the nest plate by a gap 48, and can flex to account for slight variations in width of the stringer.

Figure 8:
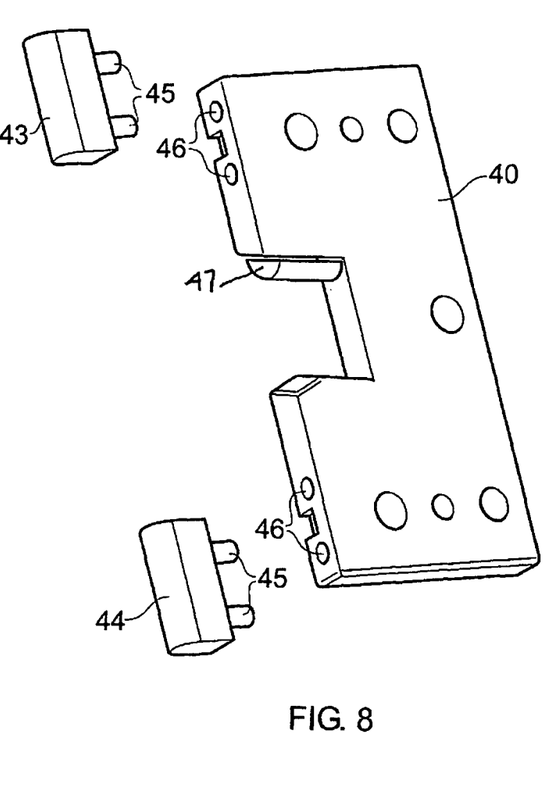
FIG. 8 is a perspective view of the nest plate showing the pair of tips removed.

As shown in FIG. 8, each renewable tip 43,44 has a pair of pegs 45 which are received in holes 46 in the upper edge of the nest plate 40. This enables the tips 43,44 to be removed and replaced by new tips in the event that they become flattened over time due to the clamping pressure. Furthermore, the tips 43,44 are formed by a harder material than the nest plate 40 to provide increased resistance to such flattening.

Figure 9:
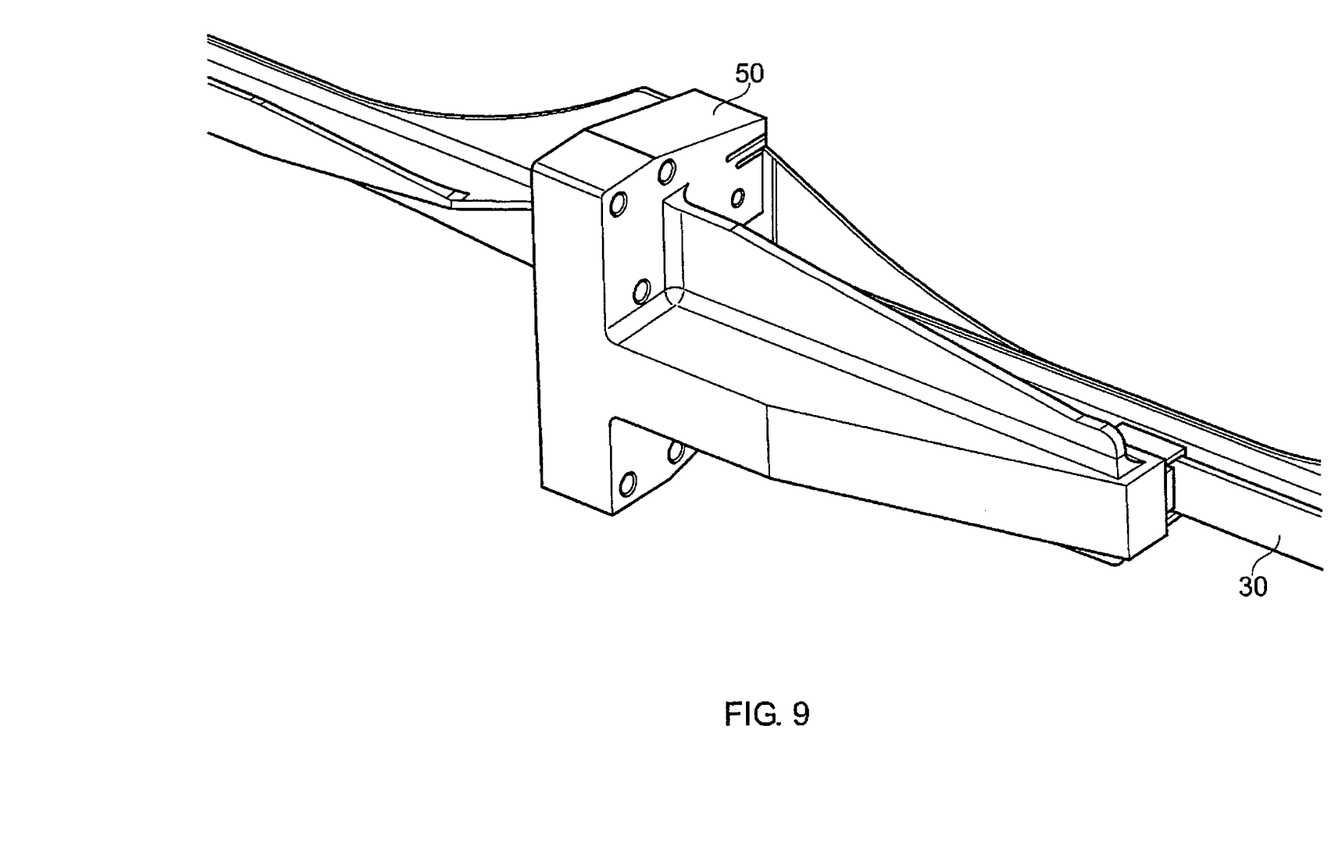
FIG. 9 shows another part of a stringer.
Figure 10:
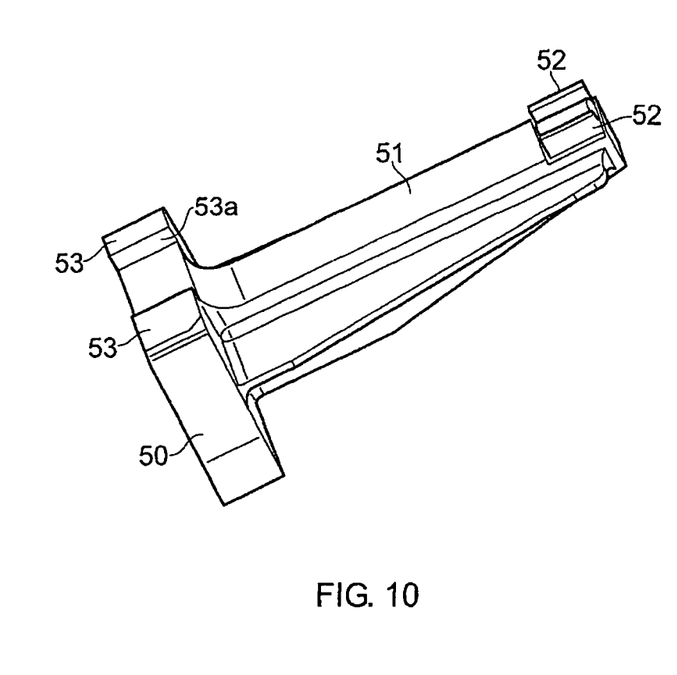
FIG. 10 is a perspective view of the datum part shown in FIG. 9.
Figure 11:
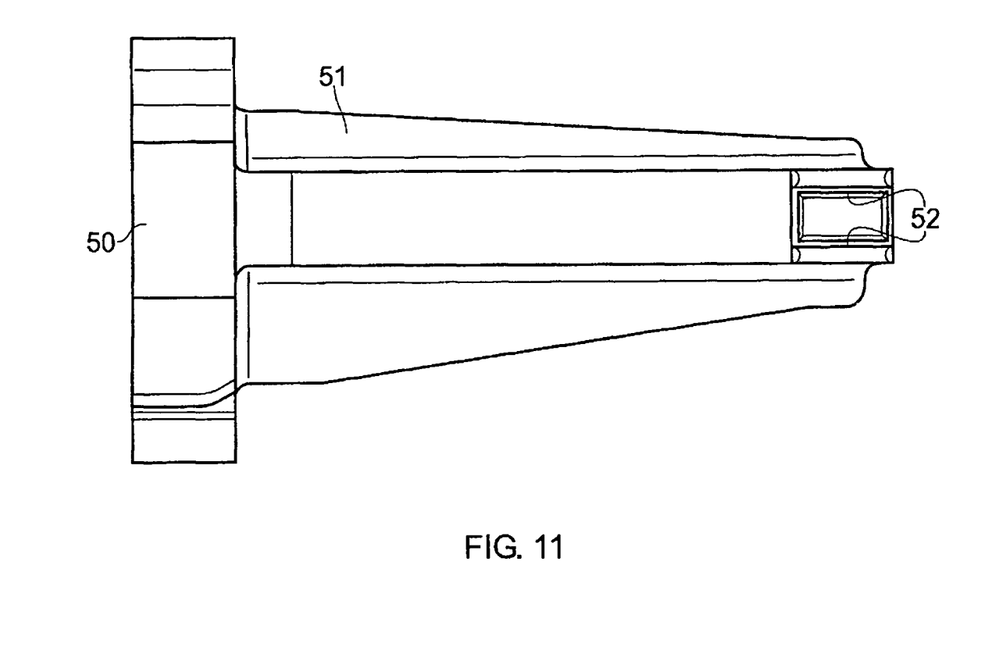
FIG. 11 is a plan view of the datum part shown in FIG. 9.

FIG. 9 shows another part of the stringer 30. At this point the skin is relatively thin, so a different method of interfacing with the jig is required. A datum part, shown in detail in FIGS. 10 and 11, is held by a profile board (not shown) of the jig. The datum part comprises an arm 51 which extends from a block 50 and carries a pair of clips 52 at its distal end which grip the sides of the lower flanges as shown in FIG. 9. The upper edge of the block 50 has a pair of blocks 53, one formed with a resilient spring 53a which can flex to account for slight variations in width of the stringer.

Figure 12:
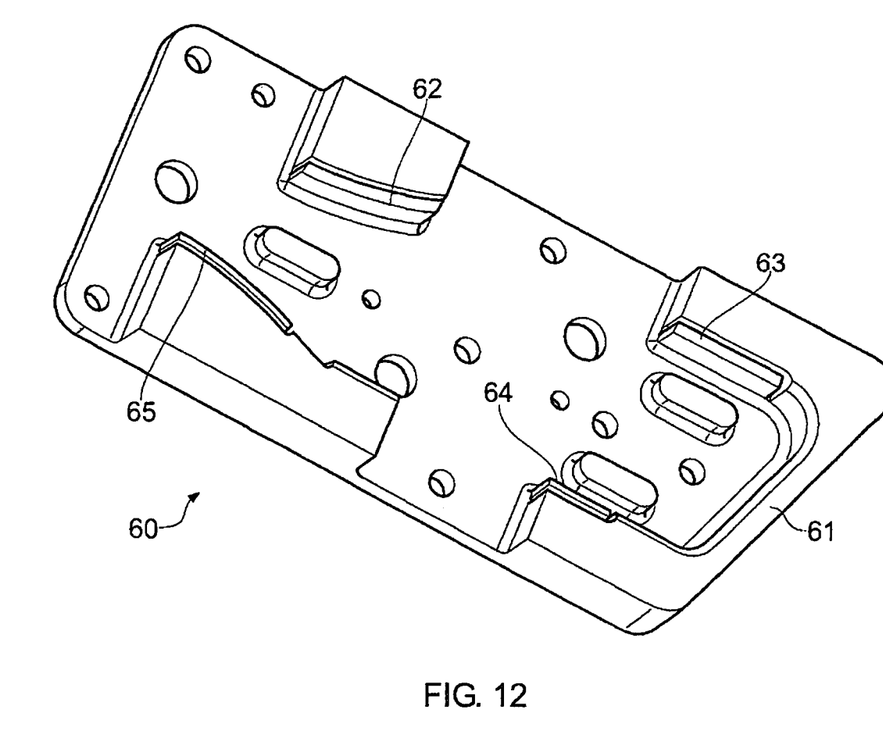
FIG. 12 is a perspective view of an alternative datum part.

An alternative datum part 60 is shown in FIG. 12. In this case the datum part has an end stop 61 which engages an end edge of the lower flanges of the stringer, and the sides of the stringer are engaged by resilient springs 62-65. Note that no clips are provided with this datum block.

Figure 13:
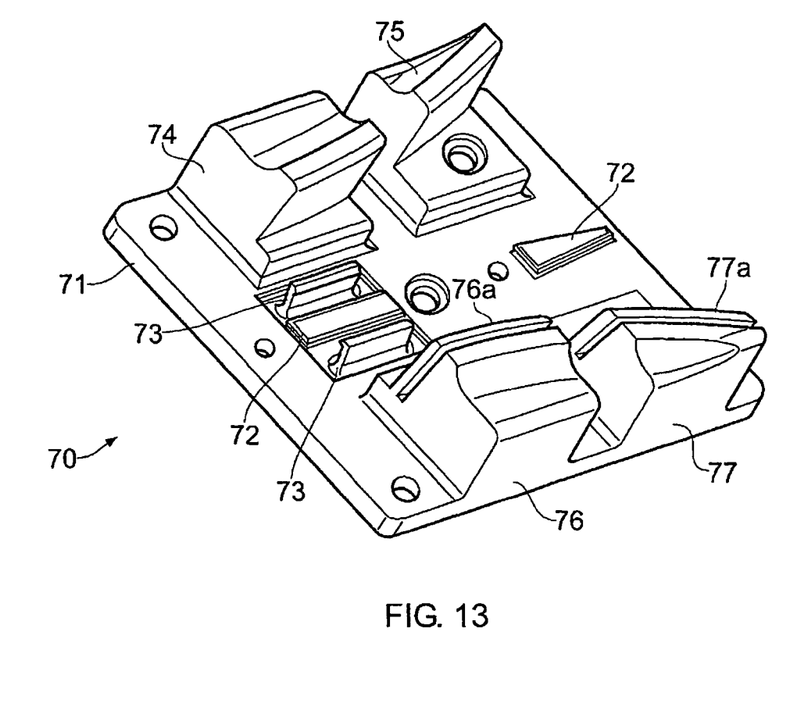
FIG. 13 is a perspective view of an alternative datum part.

A further alternative datum part 70 is shown in FIG. 13. The datum part 70 comprises a plate 71 carrying two stringer height stop blocks 72, a pair of resilient clips 73, and four stringer side stop blocks 75-77. The stop blocks 76 and 77 are formed with resilient springs 76a and 77a.

Figure 14:
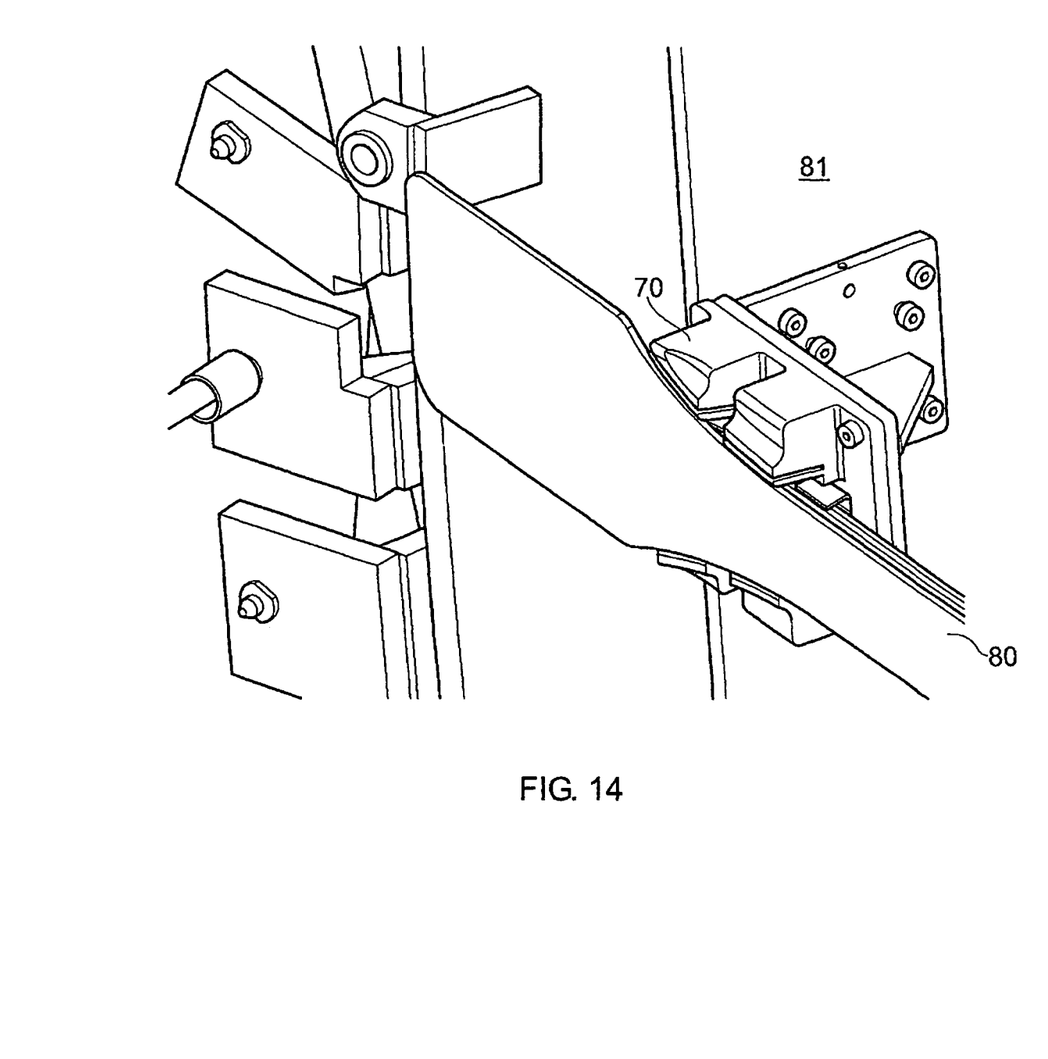
FIG. 14 is a perspective view of a stringer fitted to the datum part of FIG. 13.

As shown in FIG. 14, after the datum part 70 has been fixed in place to a profile board 81 of the jig, the inboard end of a stringer 80 is fitted to the datum part. The profile board 81 represents "rib 1" of the wing—that is, the inboard rib. When fixed to the datum part 70, the lower faces of the lower flanges of the stringer 80 engage the stringer height stop blocks 72, the lower flanges are gripped by the clips 73, and the upper flanges engage the springs 76a,77a and the nesting faces of the blocks 74,75.

After the stringers have been fitted to the various datum parts 10,50,60,70 and the nest plates 40 have been clamped in place, then the stringers are joined along their length to the skin by fasteners (not shown). The datum parts 10,50,60,70 ensure that the stringers are held against the skin by the jig in precisely the correct position before the fasteners are fitted.

Figure 15:
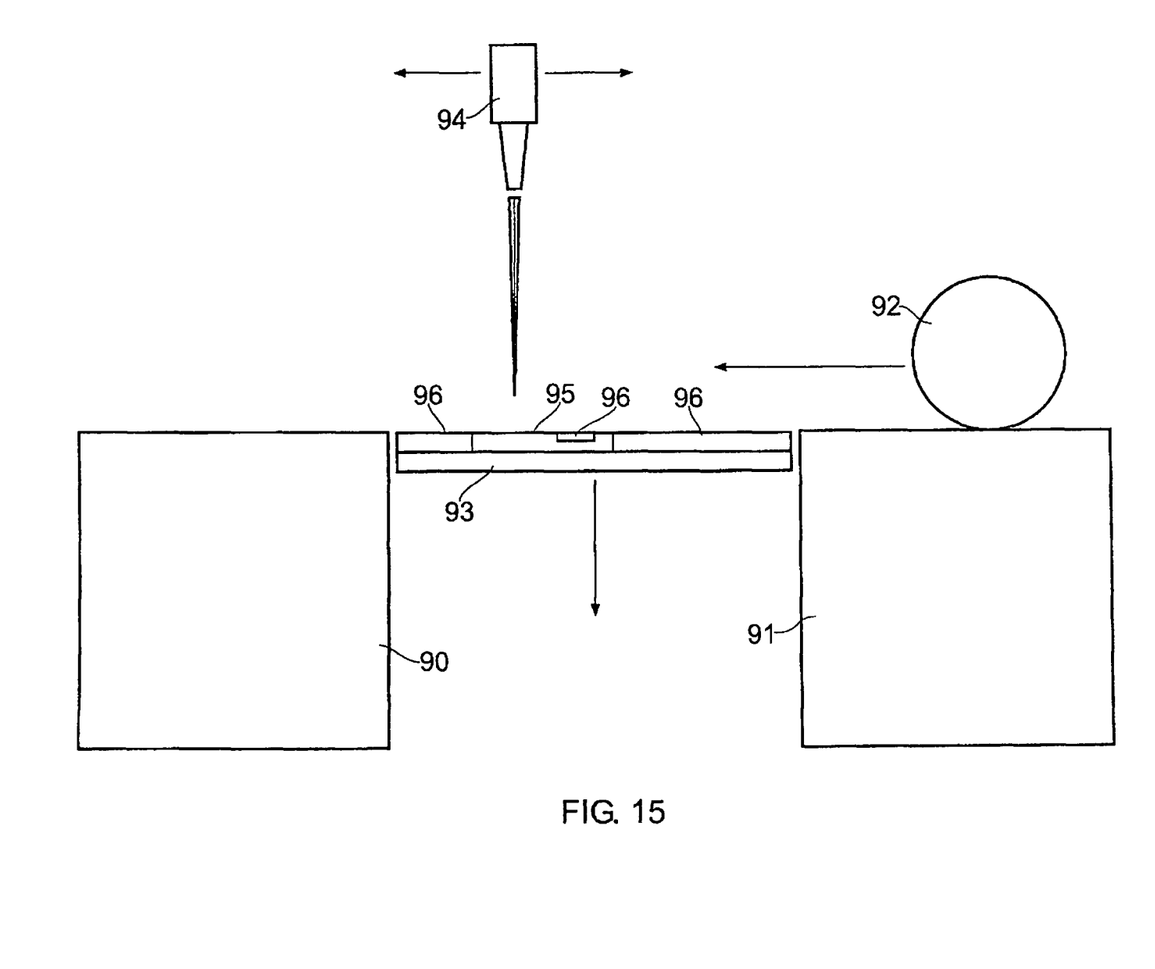
FIG. 15 shows a powder bed additive manufacturing system.

The datum parts 10,50,60,70 and nest plates 40 are each grown in a series of layers by a powder bed additive manufacturing system shown in FIG. 15. The powder bed system grows the part by scanning a laser head laterally across a powder bed and directing the laser to selected parts of the powder bed. More specifically, the system comprises a pair of feed containers 90, 91 containing powdered metallic material such as powdered Titanium. A roller 92 picks up powder from one of the feed containers (in the example of FIG. 15, the roller 92 is picking up powder from the right hand feed container 91) and rolls a continuous bed of powder over a support member 93. A laser head 94 then scans over the powder bed, and a laser beam from the head is turned on and off under the control of computer-aided design (CAD) model of the part, to melt the powder in a desired two-dimensional pattern. The support member 93 then moves down by a small distance (typically of the order of 0.1 mm) to prepare for growth of the next layer. After a pause for the melted powder to solidify, the roller 92 proceeds to roll another layer of powder over support member 93 in preparation for sintering. Thus as the process proceeds, a sintered part 95 is constructed, supported by unconsolidated powder parts 96. After the part has been completed, it is removed from the support member 93 and the unconsolidated powder 96 is recycled before being returned to the feed containers 90, 91.

The additive process shown in FIG. 15 provides a convenient method of manufacturing the datum parts 10,50,60,70 and nest plates 40 in precisely the right shape and size for their intended purpose. Different datum parts can be made by simply changing the CAD model. This enables the same jig to be used to manufacture a variety of different panel designs, as well as giving the ability of using datum blocks with different shapes and sizes in the manufacture of a single panel, each tailor-made to fit a respective stringer.

Although the invention has been described above with reference to one or more preferred embodiments, it will be appreciated that various changes or modifications may be made without departing from the scope of the invention as defined in the appended claims.

The invention claimed is:

1. A method of manufacturing a stiffened aircraft panel, the method comprising:
    holding the panel and a plurality of datum parts with a jig, at least two of the datum parts having a different shape or size;
    engaging the panel with a plurality of stringers and engaging each datum part with a respective one of the stringers; and
    joining the stringers to the panel, wherein the datum parts have been manufactured by an additive process.

2. The method of claim 1 wherein the stringer extends lengthwise between a pair of end faces, and wherein the datum part engages one of the end faces of the stringer.

3. The method of claim 1 wherein the datum part has a resilient member which engages the stringer.

4. The method of claim 1 wherein the datum part comprises a base; one or more height stops extending from the base by a first distance, and two or more side stops extending from the base by a second distance greater than the first distance.

5. The method of claim 1 comprising growing the datum part in a series of layers, each layer being grown by directing energy and/or material from a head to selected parts of a build region.

6. The method of claim 5 further comprising the step of causing relative movement between the head and the build region.

7. The method of claim 5 wherein the additive process comprises depositing a series of beds of material on a build region; and directing energy from the head to selected parts of each bed.

8. The method of claim 1 wherein the datum part is formed by fusing a powder.

9. The method of claim 1 wherein the datum part comprises a base; one or more side stop blocks extending from the base and positioned towards the periphery of the base; and one or more resilient members, and wherein the method further comprises:
    engaging the stringer with the side stop block(s); and
    securing the stringer to the datum part with the resilient member(s).

10. Apparatus for manufacturing a stiffened panel by the method of claim 1, the apparatus comprising: a jig; and one or more datum parts which have been manufactured by an additive process.

11. A method of manufacturing a stiffened aircraft panel, the method comprising:
    holding the panel with a jig;
    holding a datum part with the jig;
    engaging the panel and the datum part with a stringer; and
    joining the stringer to the panel,
    wherein the datum part comprises a base, said base having a periphery, and a pair of side stop blocks extending from the base and positioned towards the periphery of the base,
    wherein one of the side stop blocks is formed with a resilient spring, and
    wherein the method further comprises the steps of:
    engaging the stringer with the side stop blocks; and
    flexing the resilient spring to account for variation in width of the stringer, wherein the stringer is secured to the datum part with a resilient clip comprising a flexible cantilever arm and a projection by pushing the stringer down so that the arm bends back and then snaps back resiliently into place to provide a snap-fit joint.

12. The method of claim 11 wherein the datum part has been manufactured by an additive process.

* * * * *